US008056813B2

(12) United States Patent
Long et al.

(10) Patent No.: US 8,056,813 B2
(45) Date of Patent: Nov. 15, 2011

(54) CHIP CARD HOLDER

(75) Inventors: Shi-Jin Long, Shenzhen (CN); Xiang-Ming Guo, Shenzhen (CN); Li Cheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 226 days.

(21) Appl. No.: 12/510,777

(22) Filed: Jul. 28, 2009

(65) Prior Publication Data
US 2010/0085716 A1 Apr. 8, 2010

(30) Foreign Application Priority Data
Oct. 6, 2008 (CN) .......................... 2008 1 0304741

(51) Int. Cl.
*G06K 7/00* (2006.01)
(52) U.S. Cl. .......... 235/486; 439/59; 439/153; 439/159; 439/328

(58) Field of Classification Search .................. 235/486; 439/59, 153, 159, 328
See application file for complete search history.

(56) References Cited

U.S. PATENT DOCUMENTS

| 7,094,082 B2 * | 8/2006 | Ooya et al. | 439/159 |
| 7,374,440 B2 * | 5/2008 | Chen et al. | 439/159 |
| 7,520,766 B2 * | 4/2009 | Tsai | 439/159 |
| 2006/0134954 A1 * | 6/2006 | Xu et al. | 439/159 |
| 2006/0270260 A1 * | 11/2006 | Chen et al. | 439/159 |
| 2007/0010114 A1 * | 1/2007 | Zhao | 439/159 |
| 2007/0141878 A1 * | 6/2007 | Van der Steen et al. | 439/159 |
| 2009/0269944 A1 * | 10/2009 | Gao et al. | 439/59 |

* cited by examiner

*Primary Examiner* — Allyson Trail
(74) *Attorney, Agent, or Firm* — Altis Law Group, Inc.

(57) ABSTRACT

The chip card holder includes a body member, a card receiving space formed on the body member and a releasing piece. The card receiving space has an opening to insert a chip card along a direction perpendicular to the longitudinal direction of the card receiving space. The releasing piece is slidably mounted on the body member along the longitudinal direction and is configured for either exposing the opening to insert the chip card or locking the chip card in the card receiving space.

20 Claims, 4 Drawing Sheets

CHIP CARD HOLDER

CROSS-REFERENCE TO RELATED APPLICATION

This application is related to co-pending U.S. patent application Ser. No. 12/510,792 both entitled "CHIP CARD HOLDER". Such application has the same assignee as the present application. The above-identified application is incorporated herein by reference.

BACKGROUND

1. Technical Field

The exemplary disclosure generally relates to a chip card holder for a portable electronic device.

2. Description of Related Art

With the development of wireless technology, portable electronic devices are becoming widely used and multifunctional. Portable electronic devices such as mobile phones typically have chip cards (e.g., SIM card) for storing usable information. It is necessary to provide chip card holders for holding/securing the chip card within the portable electronic device.

The chip card holder usually defines a receiving space and a holding member. The chip card can be partially received and held in the receiving space by the holding member. Accordingly, the chip card has an exposed portion which is not received in the receiving space. The exposed portion is used for the removal (e.g., to be pulled by users) of the chip card out of the receiving space. However, the exposed portion is usually too small and therefore difficult for a user to grasp in removing the chip card from the holder.

Therefore, there is room for improvement within the art.

BRIEF DESCRIPTION OF THE DRAWINGS

Many aspects of the exemplary chip card holder can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
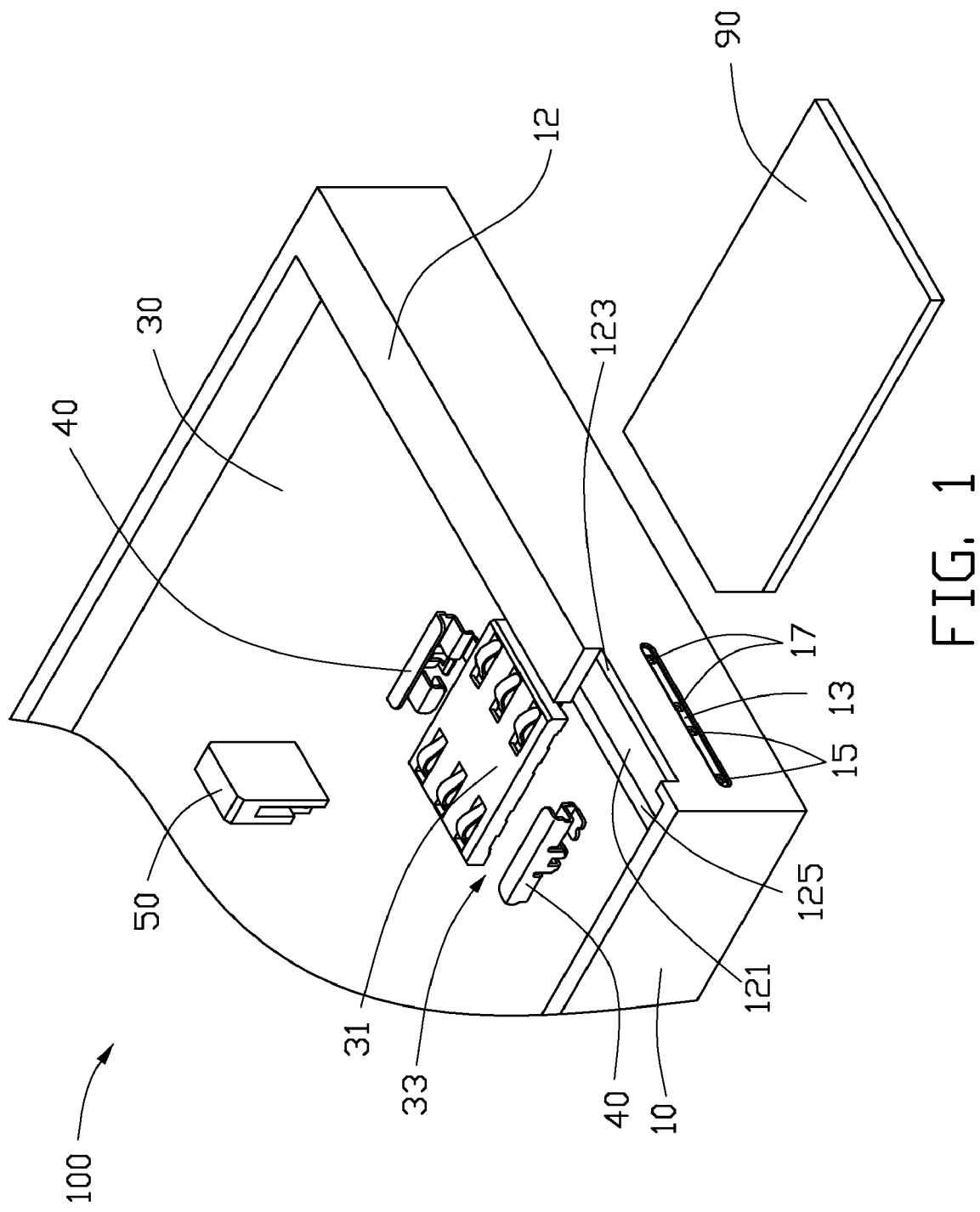
FIG. 1 shows a disassembled perspective view of a chip card holder according to an exemplary embodiment.

FIG. 1 shows an exemplary chip card holder 100 used in a portable electronic device (e.g., a mobile phone). The chip card holder 100 is used to hold a chip card 90 therein and includes a body member 10, a circuit board 30, two clamping pieces 40 and a releasing piece 50.

The body member 10 may be part of a housing (e.g., a bottom wall thereof) of the portable electronic device. The body member 10 includes a sidewall 12 and defines a groove 121 recessed from the sidewall 12 adjacent to one end thereof so as to assemble the releasing piece 50. The groove 121 includes an outer sidewall 123 and an opposite inner sidewall 125. The outer sidewall 123 defines a guiding slot 13 recessed therefrom parallel to the groove 121. The length of the guiding slot 13 is substantially the same as the length of the groove 121. The guiding slot 13 defines a first positioning portion 15 and an opposite second positioning portion 17 at the two ends of the guiding slot 13. The first positioning portion 15 and the second positioning portion 17 both include at least one hemispherical positioning depression recessed from the bottom wall of the guiding slot 13. In the present embodiment, the first positioning portion 15 and the second positioning portion 17 both include two hemispherical positioning depressions spaced recessed from the bottom wall of the guiding slot 13.

The circuit board 30 is mounted on the body member 10 adjacent to the groove 121. The circuit board 30 includes a card connector 31 disposed thereon adjacent to one end of the groove 121 of the body member 10.

The two clamping pieces 40 are disposed on the circuit board 30 and located at the two opposite sides of the card connector 31. The two clamping piece 40, the circuit board 30, the card connector 31 form a card receiving space 33. The card receiving space 33 has an opening (not labeled) toward the second positioning portion 17 and perpendicular to the sidewall 12 to receive the chip card 90. The opening is used to insert the chip card 90 along a longitudinal direction of the card receiving space 33. Thus, the groove 121 is disposed at a longitudinal direction of the card receiving space 33 and adjacent to the opening of the card receiving space 33.

Figure 2:
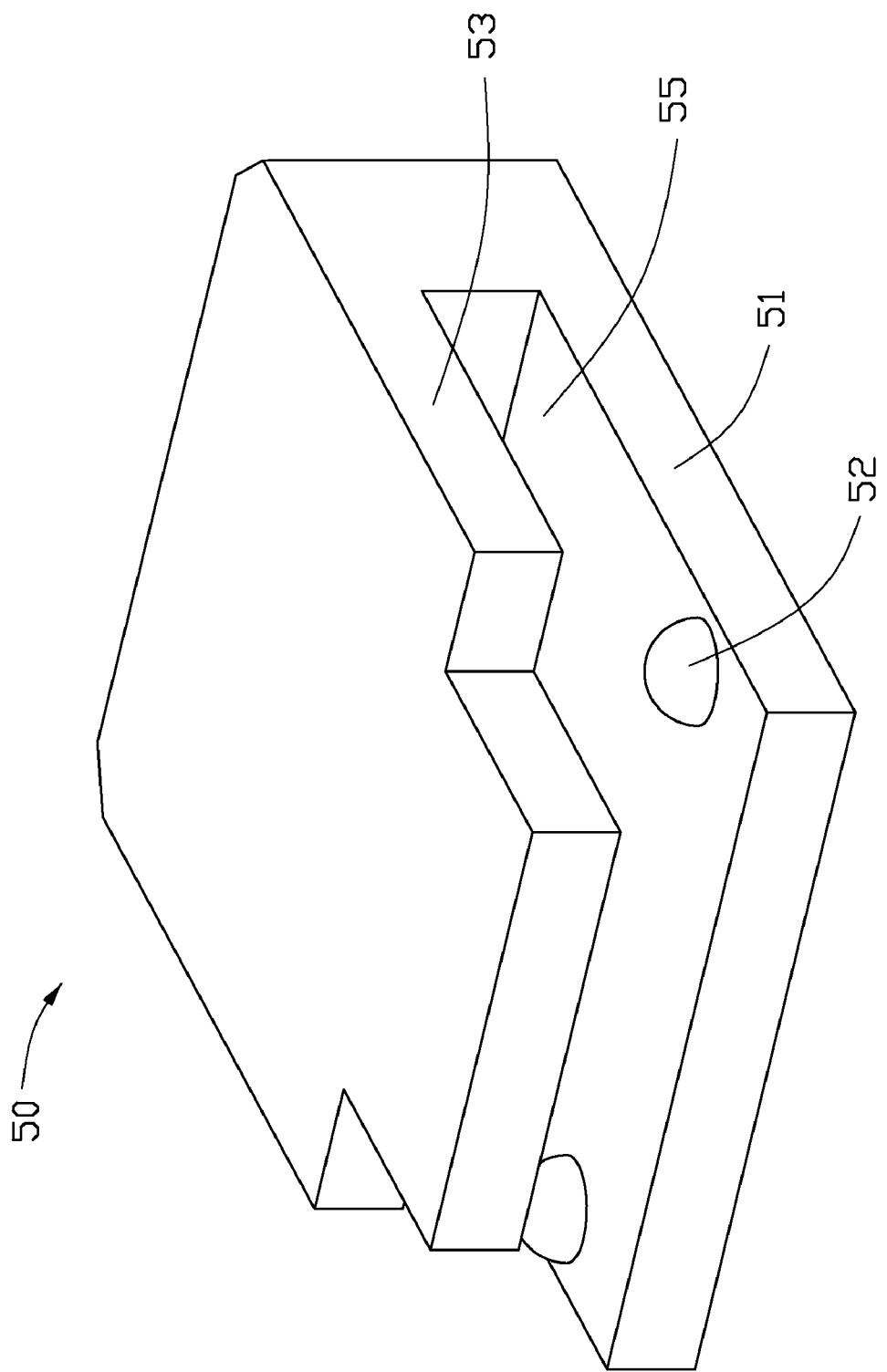
FIG. 2 shows a perspective view of the releasing piece of the chip card holder.

Referring to FIG. 2, the releasing piece 50 is a substantially U-shaped cross sectional body and is slidably mounted on the outer sidewall 123 of the groove 121 along a direction perpendicular to the longitudinal direction of the card receiving space 33 and partially accommodated within the groove 121 of the body member 10 so as to lock and release the chip card 90. The releasing piece 50 includes a latching wall 51, a resisting wall 53 spaced and parallel to the latching wall 51, and an assembling space 55 formed between the latching wall 51 and the resisting wall 53. The inner surface of the latching wall 51 opposite to the resisting wall 53 defines at least one hemispherical guiding protrusion 52 protruding therefrom corresponding to the at least one hemispherical positioning depression of the guiding slot 13. In the present embodiment, the inner surface of the latching wall 51 opposite to the resisting wall 53 defines two spaced hemispherical guiding protrusions 52 protruding therefrom corresponding to the two hemispherical positioning depressions of the guiding slot 13. The interval distance between the latching wall 51 and the resisting wall 53 is substantially the same as the thickness of the outer sidewall 123 of the body member 10. The thickness of the resisting wall 53 is substantially the same as the width of the groove 121. Thus, the latching wall 51 and the resisting wall 53 tightly resist on the two sides of the outer sidewall 123 respectively. The two spaced hemispherical guiding protrusions 52 are slidably assembled within the guiding slot 13 and could be positioned at the first positioning portion 15 or the second positioning portion 17.

Figure 3:
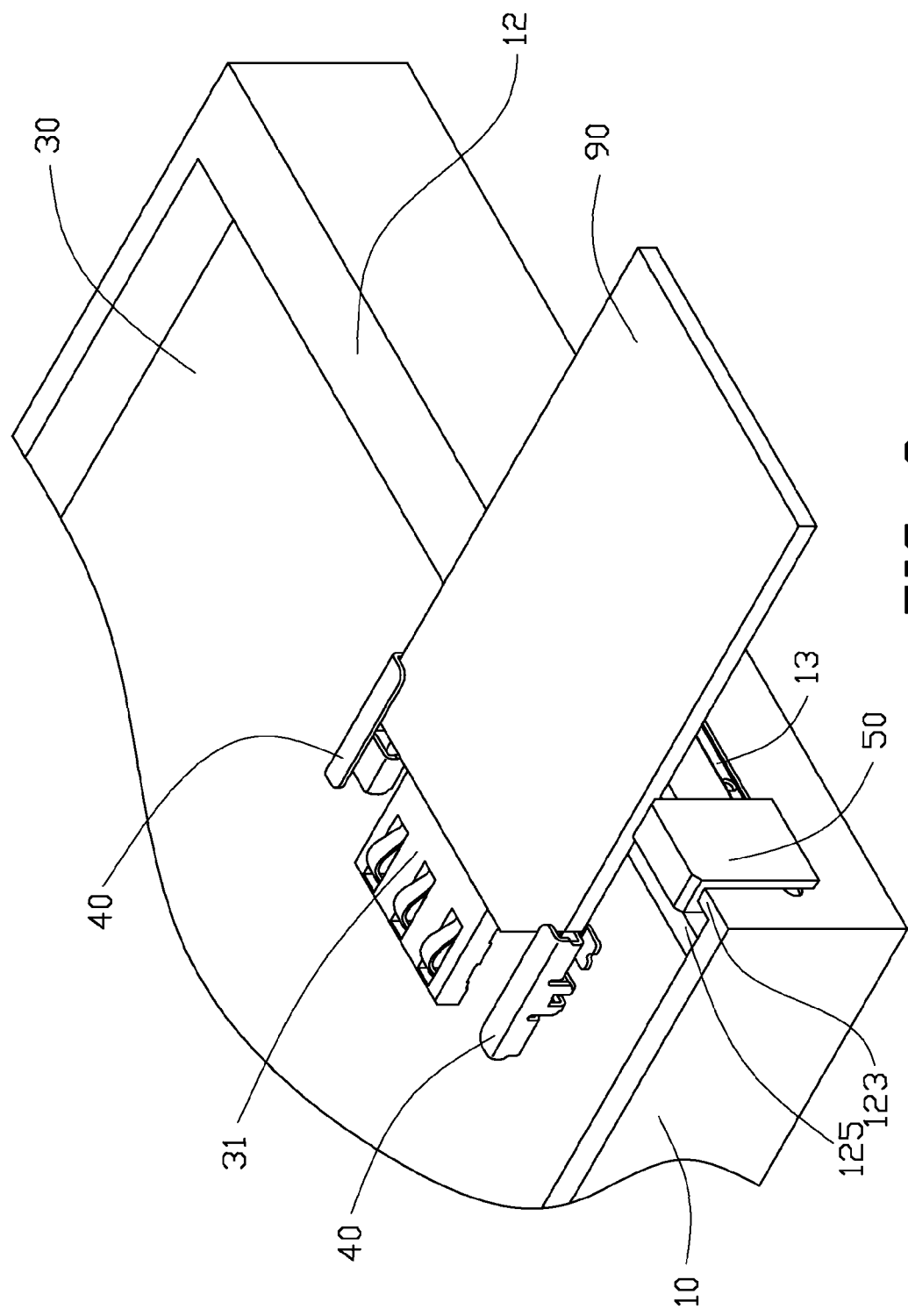
FIG. 3 shows a perspective view of the chip card holder, wherein, a chip card is partially assembled and accommodated within the card receiving space of the chip card holder
Figure 4:
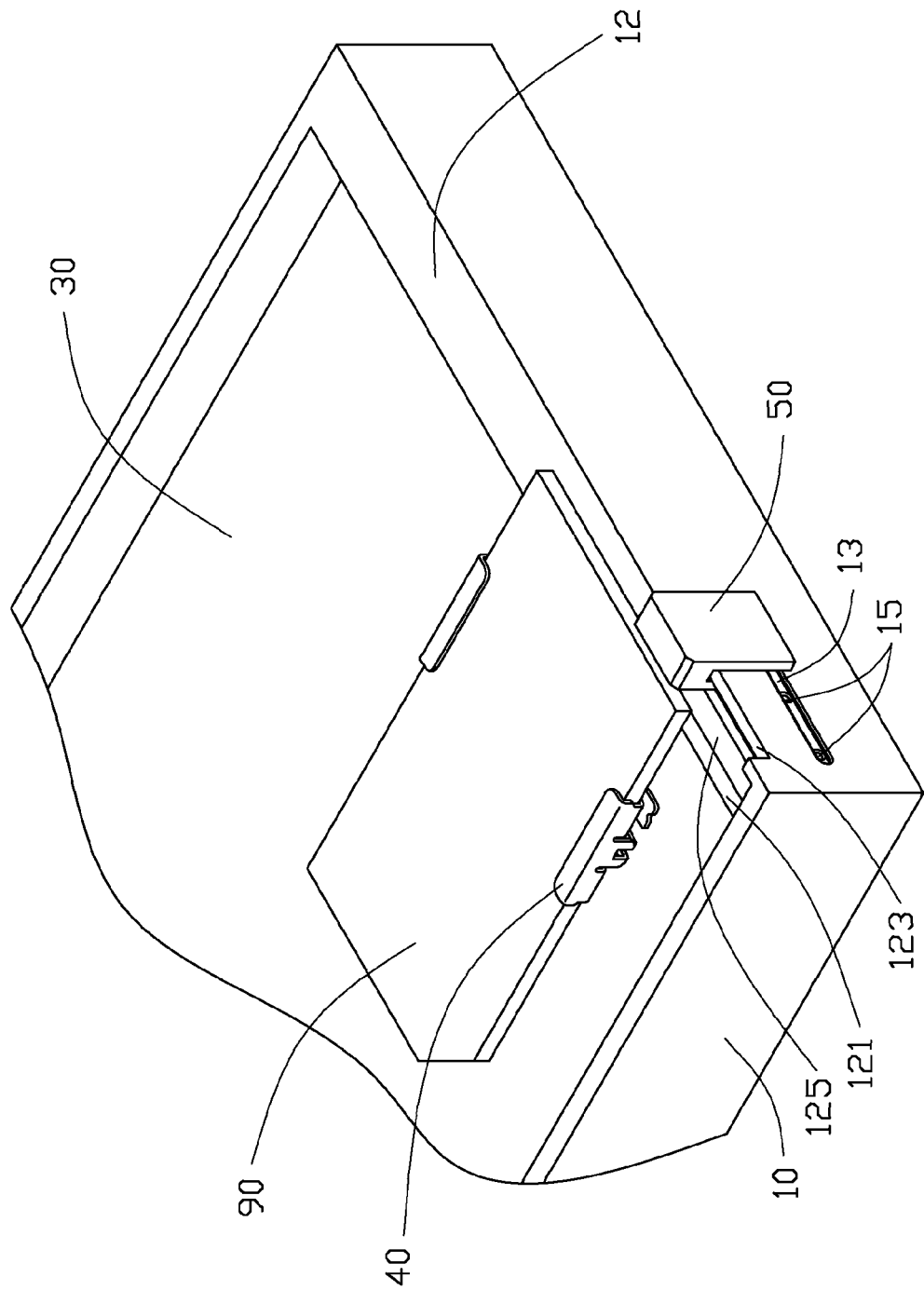
FIG. 4 shows a perspective view of the chip card holder, wherein, a chip card is assembled and accommodated within the card receiving space of the chip card holder.

Also referring to FIG. 3 and FIG. 4, when assembling the chip card 90 into the card receiving space 33 of the chip card holder 100, the releasing piece 50 is moved along the guiding slot 13 from the second positioning portion 17 toward the first positioning portion 15 and located at the first positioning portion 15. The two spaced hemispherical guiding protrusions 52 are latched into the corresponding two hemispherical positioning depressions of the first positioning portion 15. Then, the releasing piece 50 is located adjacent to the card receiving space 33, but is not aligned with the card receiving space 33 to expose the opening. One end of the chip card 90 slides along the two clamping pieces 40 into the card receiving space 33 of the chip card holder 100. The sliding direction of the releasing piece 50 is perpendicular to the inserting direction of the chip card 90. The releasing piece 50 is moved along the guiding slot 13 from the first positioning portion 15 toward the second positioning portion 17 and located at the second positioning portion 17 at the front of the opening of the card receiving space 33. The two spaced hemispherical guiding protrusions 52 are latched into the corresponding two hemispherical positioning depressions of the second positioning portion 17. The releasing piece 50 resists on the opposite end of the chip card 90 to hold and prevent the chip card 90 departing from the card receiving space 33, thus, the chip card 90 is tightly locked and accommodated within the card receiving space 33.

To release the chip card 90 from the card receiving space 33 of the chip card holder 100, the releasing piece 50 is moved toward the first positioning portion 15 end till the releasing piece 50 slide aside to the opening of the car receiving space 33. Thus, the chip card 90 can be taken out easily by sliding out along the two clamping pieces 40 and the releasing piece 50 is released to return back to the original position.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder comprising:
a body member defining a card receiving space and configured for accommodating a chip card therein, the card receiving space having an opening used to insert the chip card along a longitudinal direction of the card receiving space; and
a releasing piece being a substantially U-shaped cross sectional body slidably mounted on the body member along a direction perpendicular to the longitudinal direction and being configured for either exposing the opening to insert the chip card or locking the chip card in the card receiving space.

2. The chip card holder as claimed in claim 1, wherein the body member includes a sidewall and defines a groove adjacent to and ahead of the opening of the card receiving space, the releasing piece is slidably assembled to the groove and positioned ahead of the opening of the card receiving space.

3. The chip card holder as claimed in claim 2, wherein the groove includes an outer sidewall and an opposite inner sidewall, the releasing piece is slidably mounted on the outer sidewall of the groove and partially accommodated within the groove.

4. The chip card holder as claimed in claim 3, wherein the outer sidewall defines a guiding slot recessed therefrom parallel to the groove, the guiding slot defines a first positioning portion and an opposite second positioning portion at the two ends of the guiding slot respectively; the releasing piece includes a latching wall, the latching wall defines at least one guiding protrusion corresponding to the guiding slot and configured for slidably latching with the guiding slot.

5. The chip card holder as claimed in claim 4, wherein the first positioning portion and the second positioning portion both include at least one hemispherical positioning depression recessed from the bottom wall of the guiding slot corresponding to the at least one guiding protrusion of the releasing piece.

6. The chip card holder as claimed in claim 5, wherein the chip card holder further includes a circuit board and two clamping pieces, the circuit board is mounted on the body member adjacent to the groove; the two clamping pieces are spaced apart and disposed on the circuit board, perpendicular to the groove; the two clamping pieces, a card connector, and the circuit board form the card receiving space.

7. The chip card holder as claimed in claim 6, wherein the card connector is disposed on the circuit board and located between the two opposite clamping pieces.

8. The chip card holder as claimed in claim 6, wherein the length of the guiding slot is substantially the same as the length of the groove.

9. The chip card holder as claimed in claim 4, wherein the releasing piece further includes a resisting wall spaced and parallel to the latching wall, and an assembling space formed between the latching wall and the resisting wall; the thickness of the resisting wall is substantially the same as the width of the groove, the latching wall and the resisting wall tightly resist on the two sides of the outer sidewall respectively.

10. A chip card holder comprising:
a body member defining a card receiving space having an opening for inserting a chip card therein along a longitudinal direction of the card receiving space and a groove adjacent to and ahead of the opening of the card receiving space, the groove including an outer sidewall and an opposite inner sidewall; and
a releasing piece slidably assembled to the outer sidewall of the groove and being configured to be positioned either in front of the opening of the card receiving space to hold the chip accommodated within the card receiving space or aside of the opening of the card receiving space to release the chip card.

11. The chip card holder as claimed in claim 10, wherein the chip card holder further includes a circuit board and two clamping pieces, the circuit board is mounted on the body member adjacent to the groove; the two clamping pieces are spaced apart and disposed on the circuit board, perpendicular to the groove; the two clamping pieces, a card connector, and the circuit board form the card receiving space.

12. The chip card holder as claimed in claim 11, wherein the releasing piece is a substantially U-shaped cross sectional body and is partially accommodated within the groove.

13. The chip card holder as claimed in claim 12, wherein the outer sidewall defines a guiding slot recessed therefrom parallel to the groove, the guiding slot defines a first positioning portion and an opposite second positioning portion at the two ends of the guiding slot respectively; the releasing piece includes a latching wall, the latching wall defines two spaced guiding protrusions and configured for slidably latching with the guiding slot.

14. The chip card holder as claimed in claim 13, wherein the first positioning portion and the second positioning portion both include two hemispherical positioning depressions spaced recessed from the bottom wall of the guiding slot corresponding to the two guiding protrusions of the releasing piece.

15. A chip card holder comprising:
a body member defining a card receiving space and configured for accommodating a chip card therein, the card receiving space having an opening used to insert the chip card there into;
a circuit board, the circuit board mounted on the body member;

two clamping pieces spaced apart and disposed on the circuit board; and a releasing piece slidably mounted on the body member and being configured to be positioned either in front of the opening of the card receiving space to lock the chip within the card receiving space or aside of the opening of the card receiving space to unlock the chip card.

16. The chip card holder as claimed in claim 15, wherein the sliding direction of the releasing piece is perpendicular to the inserting direction of the chip card.

17. The chip card holder as claimed in claim 16, wherein the body member includes a sidewall defines a groove adjacent to and partial located ahead of the opening of the card receiving space, the groove includes an outer sidewall and an opposite inner sidewall, the releasing piece is slidably assembled to the outer sidewall of the groove and partially accommodated within the groove.

18. The chip card holder as claimed in claim 17, wherein the outer sidewall defines two spaced positioning portions; the releasing piece includes a latching wall, the latching wall defines at least one guiding protrusion corresponding to the two positioning portions.

19. The chip card holder as claimed in claim 18, wherein the two positioning portions are two hemispherical depressions recessed from the outer sidewall corresponding to the at least one guiding protrusion of the releasing piece.

20. The chip card holder as claimed in claim 19, wherein the chip card holder further includes a card connector mounted on the circuit board, the circuit board is adjacent to the groove; the two clamping pieces are perpendicular to the groove; the two clamping pieces, the card connector, and the circuit board form the card receiving space.

* * * * *